United States Patent [19]

Weisse et al.

[11] Patent Number: 5,516,593
[45] Date of Patent: May 14, 1996

[54] ARTICLE WITH MATERIAL ABSORPTION CAVITIES TO REDUCE BUCKLING DURING DIFFUSION BONDING

[75] Inventors: Michael A. Weisse, Tolland, Conn.; Steven L. Meulink, Winona Lake, Ind.

[73] Assignee: United Technologies Corporation, Hartford, Conn.

[21] Appl. No.: 235,730

[22] Filed: Apr. 29, 1994

[51] Int. Cl.[6] .................. F01D 5/18; B23P 15/04
[52] U.S. Cl. ............... 428/586; 428/593; 428/600; 29/889.72; 29/463; 228/171; 228/193
[58] Field of Search .................. 428/586, 600, 428/593; 228/171, 193, 265; 29/889.72, 889.721, 463

[56] References Cited

U.S. PATENT DOCUMENTS

| | | | |
|---|---|---|---|
| 2,782,862 | 2/1957 | Wright | 416/233 |
| 3,383,093 | 5/1968 | Howald | 416/233 |
| 4,507,051 | 3/1985 | Lesgourgues et al. | 416/233 |
| 4,606,778 | 8/1986 | Jahnke | 228/265 |
| 4,894,898 | 1/1990 | Walker | 29/463 |
| 5,269,058 | 12/1993 | Wiggs et al. | 29/463 |

*Primary Examiner*—John Zimmerman
*Attorney, Agent, or Firm*—Thomas E. Coverstone

[57] ABSTRACT

An airfoil and its sub components for a gas turbine engine have a convex wall and a concave wall that are connected at leading and trailing edges. Internal supports extending from the convex and concave walls define a series of airfoil supports that have at least one primary cavity between them. Internal supports in the proximity of the edges define material absorption cavities that have a smaller cross-section than the cross section of the primary cavities. Pressure applied to the walls during the diffusion bonding process forces material inside the airfoil, and most particularly the airfoil edges, to yield towards the center of the airfoil. The material absorption cavities absorb material that yields during the diffusion bonding process and prevent buckling of the walls.

11 Claims, 4 Drawing Sheets

ARTICLE WITH MATERIAL ABSORPTION CAVITIES TO REDUCE BUCKLING DURING DIFFUSION BONDING

TECHNICAL FIELD

This invention relates to hollow articles that are manufactured using diffusion bonding techniques.

BACKGROUND ART

Hollow components such as airfoils (fan blades, compressor blades, and turbine blades) for gas turbine engines are used by engine manufacturers to reduce weight and to increase the operating engine efficiency. As engine manufacturers design engines that produce increased thrust, larger airfoils are needed. As engine size increases, reducing engine component weight becomes increasingly important. High bypass engines require very large diameter fans, and the larger fans make reducing the airfoil, or fan blade, weight while maintaining structural integrity critical. Hollow titanium fan blades help to decrease fan blade weight and provide a blade that can endure applied dynamic loads during engine operation.

Titanium hollow fan blades are fabricated using diffusion bonding often in conjunction with superplastic forming processes. Diffusion bonding forms a metallurgical bond between parts by pressing the parts together at elevated temperatures and pressures. Bonding of the parts occurs by the diffusion of atoms between adjacent part faces. Diffusion bonding provides essentially parent metal joint strength. Localized flow at the mating faces is essential to get full contact and to permit diffusion.

Superplastic forming relies on the property of certain metals, including titanium alloys, to exhibit high tensile or compressive material deformation with a minimal tendency toward local necking of the part, when the metal is exposed to time, temperature, and strain conditions within certain ranges. Both diffusion bonding and superplastic forming allow a variety of lightweight, high strength parts to be manufactured and are ideal for forming hollow titanium airfoils for gas turbine engines.

Modern hollow airfoils, such as blades and vanes, have a convex wall (the suction wall), a concave wall (the pressure wall), and a series of internal support ribs or protrusions extending spanwise (radially) and/or chordwise between the concave and convex walls, that define at least one internal cavity to reduce the weight of the airfoils while maintaining structural requirements. The walls present a problem during the diffusion bonding process. The ribs are matched together at a bond line, and the surface area of the ribs (as a function of bond plane area) is usually less at the center of the airfoil than the surface area of the edges of the airfoil, at the bond plane. The loading required for diffusion bonding causes material to flow in the direction of least resistance, which is primarily in the net direction of the applied forces, or normal to the direction of applied forces if the forces are equal and opposite. The amount of material flow is partly a function of the amount of material at the bond line. During diffusion bonding, the airfoil walls are placed in compression near the airfoil edges, as a result of material flow, and tend to buckle. Buckling of the walls distorts the structural characteristics of the part and interferes with the airflow across the airfoil. Past solutions to prevent buckling have included increasing wall thickness to resist the compressive forces or shortening the span of the cavities. However, both of these solutions increase the weight of the airfoil.

A hollow airfoil design that can be diffusion bonded without buckling and without increasing the weight of the airfoil is needed.

DISCLOSURE OF THE INVENTION

It is, therefore, an object of the present invention to provide an article geometry that can be diffusion bonded to form a hollow article without distortion and without adding features that increase the weight of the article. The present invention includes a sub component of the article, the article itself, and a method for making the article. The invention will be described in particular with reference to a hollow airfoil. However, the invention is not limited to airfoils and is applicable to other articles.

According to the present invention, an airfoil, such as a fan blade, for a gas turbine engine has a convex wall and a concave wall that are connected at leading and trailing edges. Internal ribs or protrusions extending from the convex and concave walls meet to define a series of airfoil supports that define at least one primary cavity. Internal ribs in the proximity at least a portion of the edges off at least one primary cavity smaller material absorption cavities that are designed to absorb material flow during bonding. The wall thickness adjacent the material absorption cavities (prior to diffusion bonding) is thinner than the wall thickness adjacent to the primary cavities. The pressure applied to the walls by metal flow during the diffusion bonding process forces material inside the airfoil, particularly at the edges, to yield towards the center of the airfoil. The material absorption cavities absorb or accommodate the material that yields during the diffusion bonding process to prevent buckling of the walls and distortion of the airfoil outer surface and the primary cavities. The material absorption cavities do not add material to increase the wall thickness or shorten the span of the primary cavities. The airfoils may be designed to have a structurally required minimum wall thickness without regard for the wall's reaction to forces during the diffusion bonding process.

The foregoing and other features and advantages of the present invention will become more apparent from the following description and accompanying drawings.

BEST MODE FOR CARRYING OUT THE INVENTION

The term airfoil as used here may include rotating blades or stationary vanes and is also meant to encompass other hollow structures fabricated by diffusion bonding.

Figure 1:
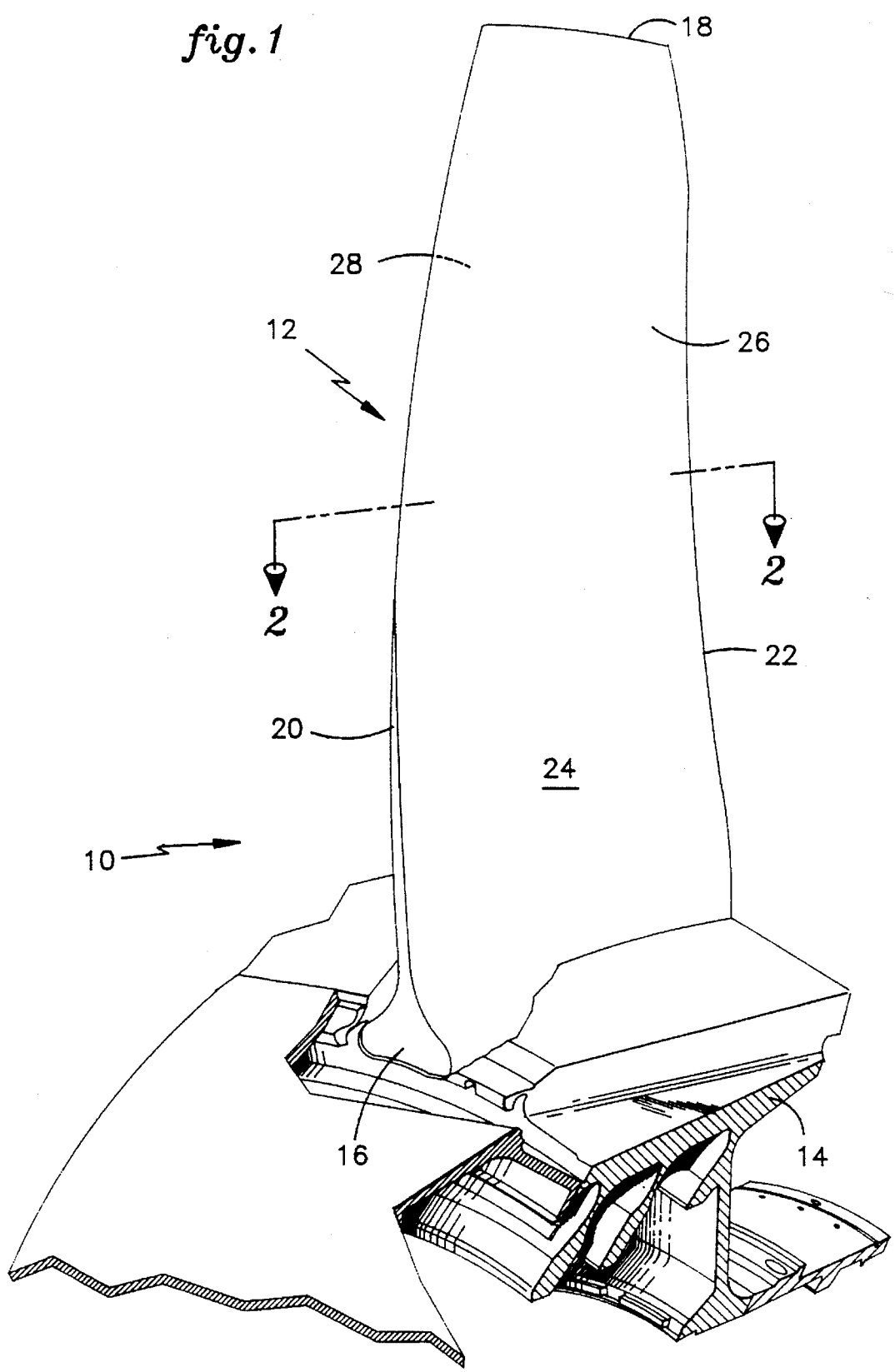
FIG. 1 is a perspective view of a fan blade supported by a disk.

According to preferred embodiment, a fan assembly 10 comprises a plurality of fan blades 12, or airfoils, supported by a fan disk 14, as shown in FIG. 1. Each airfoil 12 spans radially (span) from a root portion 16 to a tip 18, and in a chordwise (chord) direction from a leading edge 20 to a trailing edge 22 with a chordwise mid-portion 24. The chordwise mid-portion 24 is defined by a convex wall 26 and a concave wall 28 that are connected at the leading and trailing edges 20 and 22.

Figure 2:
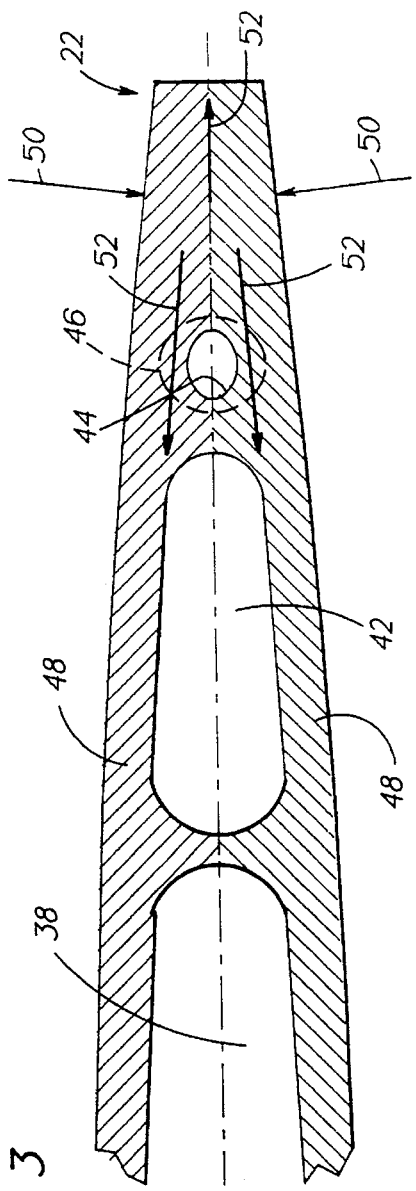
FIG. 2 is a partial cross sectional view of the fan blade.

As shown in FIG. 2, the chordwise mid-portion 24 is thicker than the leading and trailing edges 20 and 22. Wall ribs 34 protrde from a convex wall inside surface 30, and wall ribs 36 protrude from a concave wall inside surface 32. Ribs 34 and 36 are aligned and adjacent to each other at a bond line 38 to form a series of internal airfoil supports 40 which connect concave and convex walls 26, 28 after bonding. A pattern of local posts extending from the inside surfaces 30 and 32 could be used to create the internal supports in place of the ribs. The skilled designer will appreciate that a variety of rib and post patterns are possible. The area between the supports 40 defines at least one primary cavity 42. The material absorption cavities are located in areas where high metal flow is anticipated. The supports 40 in proximity to the leading and trailing edges 20 and 22 defines at least one material absorption cavity 44 that have a smaller cross section than that of the primary cavities 42. There may be a plurality of material absorption cavities 44 as required for that particular flow area of the airfoil 12 to absorb the amount of yielding material necessary to essentially eliminate buckling and distortion.

Figure 3:
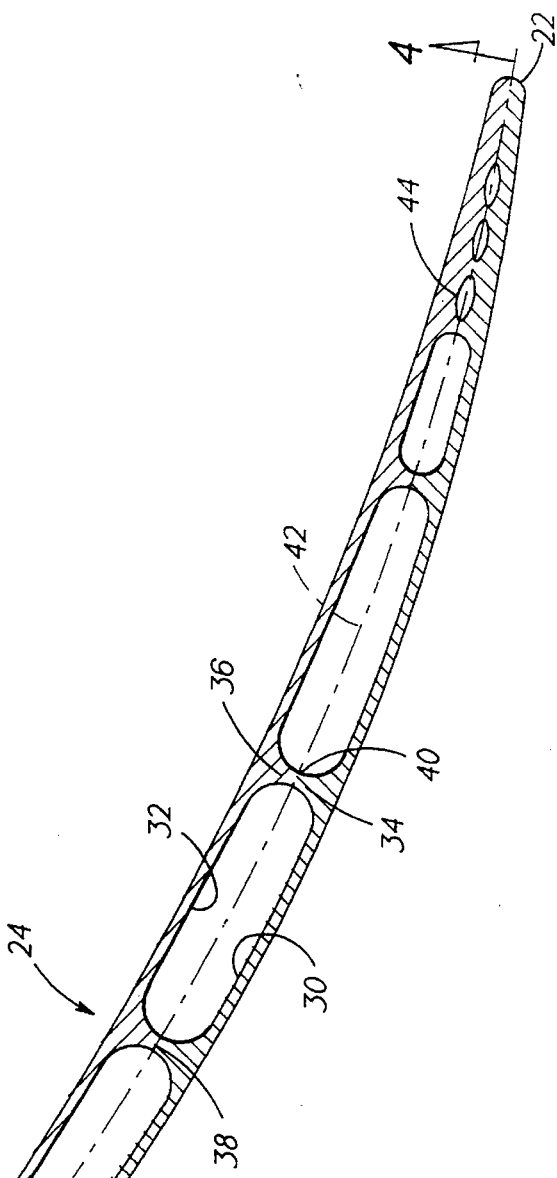
Figure. 3 is a partial cross section view of the fan blade showing a material absorption cavity of the present invention after to diffusion bonding.

The convex wall 26 and the concave wall 28 are diffusion bonded together to make the airfoil 12. As shown in FIG. 3, during diffusion bonding, forces 50 that are normal to the convex and concave walls 26 and 28 are applied to the airfoil 12, and the leading and trailing edges 20 and 22 are free to expand. Applied forces from dies cause approximately a 10% upset, or crush, of the airfoil 12. A reduction in thickness of about 5% to 15% is required to assure complete diffusion bonding. Because of the conservation of mass, as material thickness is upset, the airfoil 12 lengthens along the chord. The material inside the airfoil 12 flows in the direction of least resistance, which is primarily in the net direction of the applied forces, represented by arrows 52. This inward displacement of material from the leading and trailing edges 20 and 22 places the airfoil 12 in compression along the chord. Friction from the dies reduces the movement of the material as the material gets progressively farther away from the edges 20 and 22. The wall areas closest to the leading and trailing edges experience the highest compressive stresses. As material yields from the leading and trailing edges 20 and 22, the walls (especially near edges 20, 22) tend to yield by buckling or by thickening in the absence of a material absorption cavity according to the present invention. Some extrusion of metal, often called flash, will occur at the bond plane; for example, around the ribs at the bond plane, but this has not been shown on the drawings.

As shown in FIG. 3, the material absorption cavity 44 has an original shape 46 prior to diffusion bonding the walls 26 and 28 together. The original shape 46 (dotted lines) is designed to give the convex and concave walls a smaller wall thickness at that area prior to the diffusion bonding process relative to the wall thickness 48 adjacent to the primary cavities 42. This encourages accommodation or absorption of metal flow in the area of the absorption cavities in preference to causing buckling in the primary cavity. The small cross section of the absorption cavity prevents buckling of the wall adjacent the absorption cavity. The material absorption cavities 44 absorb or accommodate the yielding material that flows during diffusion bonding and prevents the walls from buckling. The original diameter 46 of the material absorption cavities are sized to a predetermined dimension to maintain essentially the same wall thickness after diffusion bonding as the adjacent primary cavity wall thickness 48. The material absorption cavities 44 allow the hollow airfoil 12 to have maximum structural strength with an aerodynamically non-distorted airfoil shape without adding material to the primary cavity wall thickness 48 or decreasing the span between airfoil supports 40. The wall thickness (after bonding) near the leading edge may be somewhat thicker than the wall thickness near the trailing edge to protect the airfoil from foreign object damage.

Figure 4:
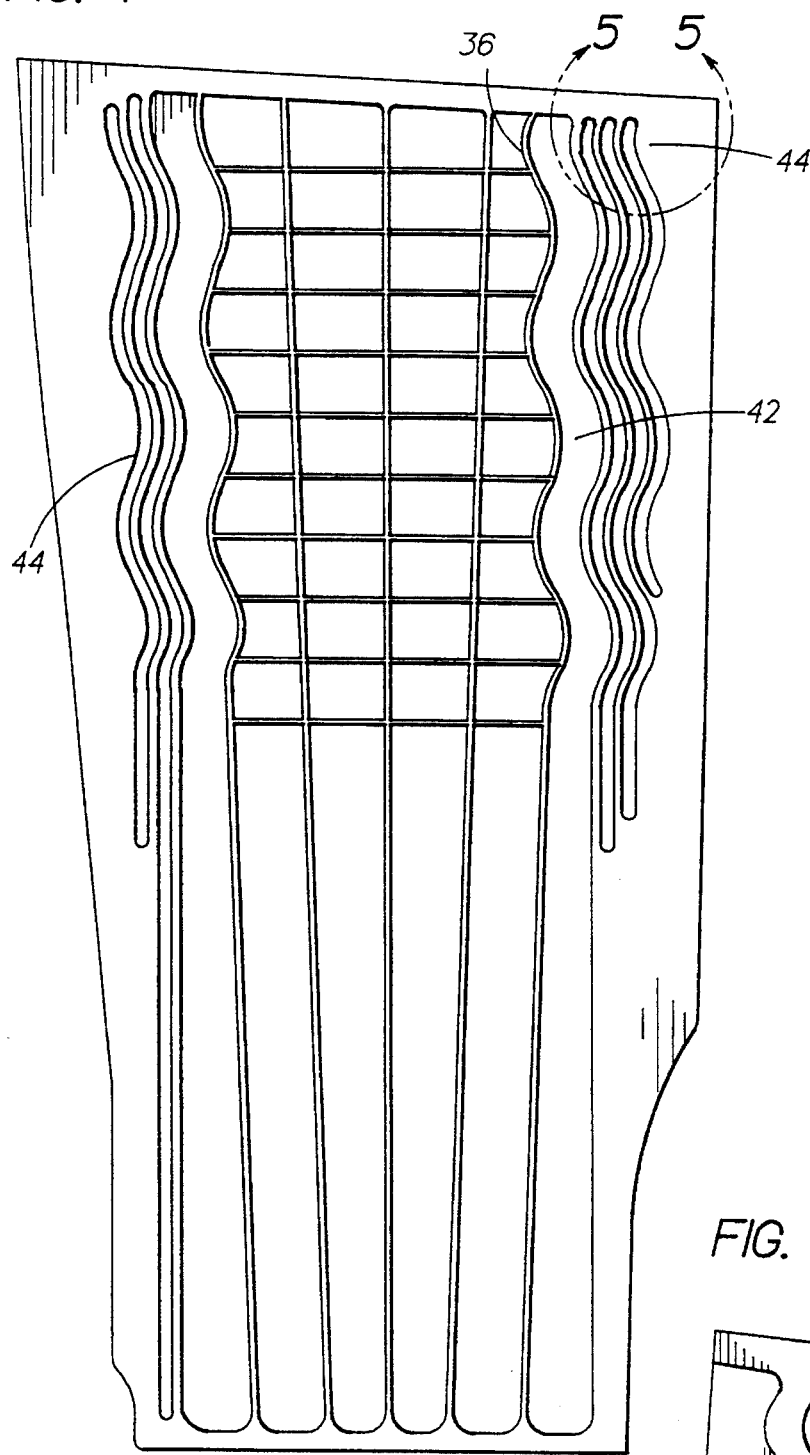
FIG. 4 is a cross sectional view of the fan blade prior to bonding.

As shown in FIG. 4, the ribs or protrusions 36 may extend radially spanwise from the root portion 16 to the tip 18, and chordwise to define the primary cavities 42. As previously mentioned, other patterns of ribs (continuous from one edge of the primary cavity to another edge or discontinuous) and/or pins are possible depending on the application. Multiple material absorption cavities 44 may be used at the leading and trailing edges 20 and 22, depending on the amount of material to be absorbed during the diffusion bonding process. The material absorption cavities 44 may have a series of radii and extend essentially non-linearly along the span in the airfoil 12, when viewed in the bond plane, to increase the airfoil shear strength.

Figure 5:
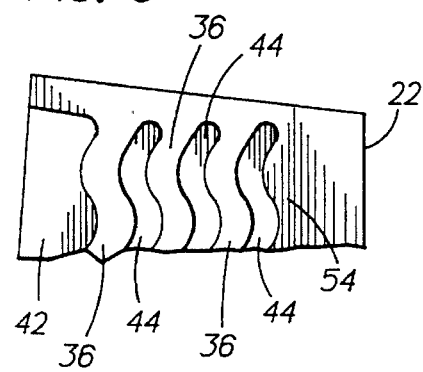
FIG. 5 is a partial cross section view of a series of material absorption cavities and fan blade supports.

As shown in FIG. 5, the trailing edge 22 is adjacent to a trailing edge bond area 54. The bond area 54 is adjacent to a series of material absorption cavities 44, ribs 36 and one of the primary cavities 42.

Figure 6:
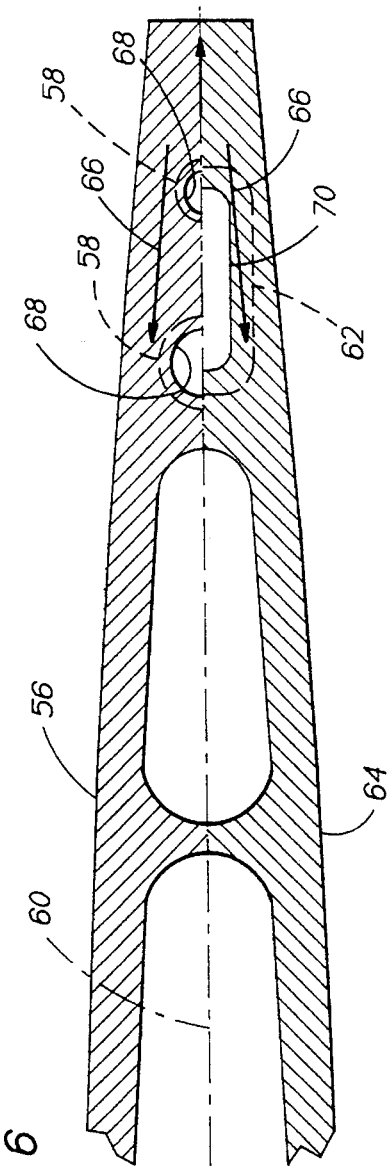
FIG. 6 is a partial cross section view of the fan blade showing an alternative material absorption cavity configuration.

As shown in FIG. 6, in a separate embodiment, a first sub component 56 has first component material absorption cavities 58 that are offset along the bond plane 60 from a second component material absorption cavity 62 of a second sub component 64. As the sub components 56 and 64 are diffusion bonded together, material yields in the direction of 66. The material absorption cavities 58 and 62 absorb yielding material and have a final configuration of 68 and 70. Thus, there is considerable flexibility possible in the design of the absorption cavities.

The material absorption cavities of this invention could have a number of configurations to achieve the final result of absorbing yielding material during diffusion bonding of sub components. In this embodiment, the first sub component 56 has two material absorption cavities 58. The second sub component 64 has only one material absorption cavity 62 to point out the variation of arrangements of material absorption cavities the present invention can have to achieve the results intended. The material absorption cavities may be a pattern of local material absorption cavities which may be located anywhere along the bond plane that will have high material flow during diffusion bonding. In general, more absorption cavity cross section will be required where more metal flow occurs. However, a cross section taken along the thickness of the airfoil at the material absorption cavities should have less area relative to a similar cross section of a primary cavity prior to diffusion bonding.

Figure 7:
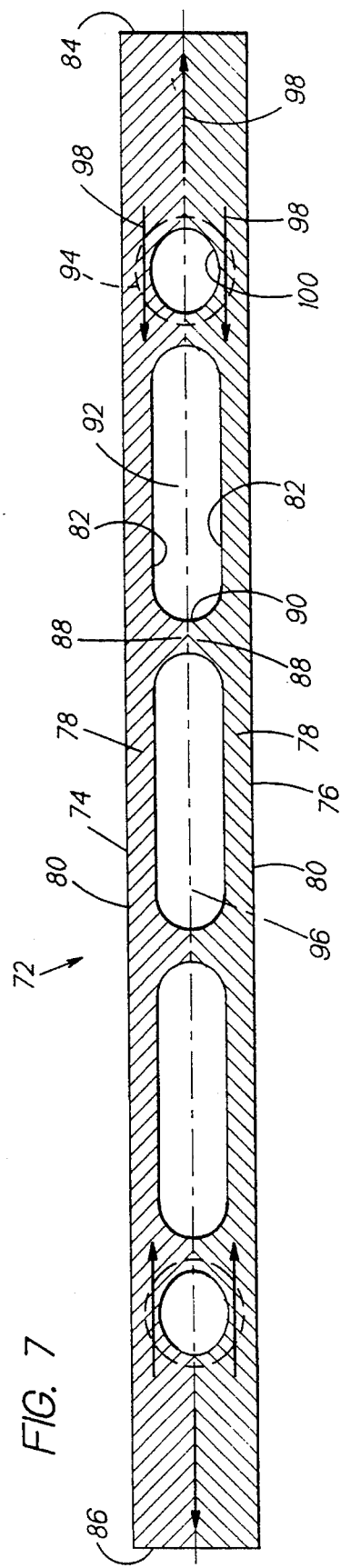
FIG. 7 is a cross section view of a generally flat article having material absorption cavities of the present invention.

FIG. 7 shows another embodiment of the present invention. An article 72 that is generally flat in shape has a first sub component 74 and a second sub component 76 with walls 78. The sub components have an outside surface 80, an inside surface 82, a first edge 84, and a second edge 86. A series of axially aligned ribs 88 extend from the inside surface 82 to a bond line 96 to define a series of supports 90, primary cavities 92, and material absorption cavities 94. When the sub components 74 and 76 are diffusion bonded together, the yielding material flows in the direction of 98, the material absorption cavity 94 absorbs some of the yielding material, and the material absorption cavity 94 has a final bond shape 100. The absorption of the yielding material prevents buckling of the walls 78 without adding weight to the article 72. As shown in this embodiment, the present invention may be used for flat articles that are to bonded together as well as for cambered, or arcuate shapes, like airfoils, as described in the best mode.

Although this invention has been shown and described with respect to a detailed embodiment, those skilled in the art will understand that various changes in form and detail may be made without departing from the spirit and scope of the claimed invention. For example, in this preferred embodiment, a first stage fan blade is shown in FIG. 2; however, the present invention may be utilized on any two members that are diffusion bonded together. In addition, in this preferred embodiment, the airfoil 12 is made of a titanium alloy and is fabricated with diffusion bonding; however, the airfoil 12 design taught herein could be applied with other alloys that may be diffusion bonded. The material absorption cavities 44 taught herein will absorb yielding material whether they are used before or after the airfoil 12 has been formed with a twist and camber.

Although this invention has been shown and described with respect to detailed embodiments thereof, it will be understood by those skilled in the art that various changes, omissions and additions in form and detail thereof may be made without departing from the spirit and scope of the claimed invention.

We claim:

1. A sub component for fabricating a bonded article that comprises:
   a wall portion having a thickness and having an inside surface;
   at least one primary cavity in said inside surface
   at least one material absorption cavity adjacent to the at least one primary cavity;
   the material absorption cavity having a smaller cross section, relative to the cross section of at the least one primary cavity and the wall having a reduced thickness adjacent to the material absorption cavity relative to the wall thickness adjacent said at least one primary cavity, the cavities configured so that the weight of the article is minimized, whereby when the sub component is matched to a similar mating sub component and diffusion bonded together, the material absorption cavity absorbs material that yields during the diffusion bonding process to prevent buckling of the wall.

2. The sub component of claim 1 further having a series of protrusions within at least one primary cavity.

3. The sub component of claim 1 wherein the wall is arcuate in shape.

4. The sub component of claim 1 wherein, the wall having essentially consistent wall thickness adjacent each primary cavity and each material absorption cavity after a diffusion bonding process that includes approximately 5% to 15% upset of the bonded article.

5. The sub component of claim 1, wherein the material absorption cavity further comprises a series of radii in the bond plane for increasing the article shear strength.

6. A bonded article, having at least a first sub component and a second sub component, the sub components bonded together at a bond plane, which comprises:
   the first sub component having a first wall, the first wall having an inside surface and a plurality of protrusions projecting from the inside surface which terminate adjacent the bond plane;
   the second sub component having a second wall, the second wall having an inside surface and a plurality of protrusions projecting from the inside surface that terminate adjacent the bond plane wherein the protrusions of the said first component are adjacent the protrusions of said second component when the two components are aligned in preparation for bonding;
   a plurality of supports created by the first wall protrusions and the second wall protrusions that are aligned relative to each other and bonded;
   at least one primary cavity defined by the supports;
   at least one material absorption cavity having a smaller cross section than the primary cavity, the cavities configured so that the weight of the article is minimized, the wall having a reduced wall thickness adjacent to the material absorption cavity relative to the wall thickness adjacent said primary cavity prior to bonding, so that the material absorption cavity absorbs material that yields when the article sub components are diffusion bonded together to prevent buckling of the walls.

7. The bonded article of claim 6 wherein the walls are arcuate in shape.

8. The bonded article of claim 6, wherein the first and second walls have essentially consistent wall thickness adjacent each primary cavity and each material absorption cavity.

9. The bonded article of claim 6 wherein the material absorption cavity further comprises a series of radii in the bond plane for increasing the article shear strength.

10. In a method of bonding, wherein two sub components having walls and at least one material absorption cavity between the walls prior to bonding; the improvement which comprises bonding the two sub components together and the material absorption cavity absorbing yielding material during bonding and essentially preventing buckling of the walls.

11. The method of claim 10, wherein the material absorption cavity further comprises a series of radii in the bond plane for increasing the bonded article shear strength.

* * * * *